(12) United States Patent
Miwa et al.

(10) Patent No.: US 8,476,866 B2
(45) Date of Patent: Jul. 2, 2013

(54) BATTERY CHARGER CAPABLE OF NOTIFYING A USER OF A POWER CONNECTION STATE THEREOF

(75) Inventors: Tatsuya Miwa, Maibara (JP); Masaki Ikeda, Hikone (JP)

(73) Assignee: Panasonic Corporation, Osaka (JP)

(*) Notice: Subject to any disclaimer, the term of this patent is extended or adjusted under 35 U.S.C. 154(b) by 377 days.

(21) Appl. No.: 12/923,495

(22) Filed: Sep. 24, 2010

(65) Prior Publication Data
US 2011/0074353 A1    Mar. 31, 2011

(30) Foreign Application Priority Data
Sep. 25, 2009   (JP) ................... 2009-221611

(51) Int. Cl.
*H01M 10/46* (2006.01)
(52) U.S. Cl.
USPC ............................................. 320/107
(58) Field of Classification Search
USPC .............. 320/107, 114, 115, 127, DIG. 12
See application file for complete search history.

(56) References Cited

U.S. PATENT DOCUMENTS

| | | | |
|---|---|---|---|
| 5,553,294 A | 9/1996 | Nanno et al. | |
| 6,396,407 B1 | 5/2002 | Kobayashi | |
| 6,555,990 B1 | 4/2003 | Yang | |
| 6,753,671 B1 | 6/2004 | Harvey | |
| 2002/0149344 A1 | 10/2002 | Harvey | |
| 2004/0000913 A1 | 1/2004 | Raichle et al. | |
| 2005/0083626 A1* | 4/2005 | Bruwer | 361/93.1 |
| 2007/0252553 A1 | 11/2007 | Mori et al. | |
| 2008/0054845 A1 | 3/2008 | Wang | |
| 2008/0174269 A1 | 7/2008 | DeRome et al. | |
| 2008/0231229 A1 | 9/2008 | Aradachi et al. | |

FOREIGN PATENT DOCUMENTS

JP    2003-9410    1/2003

OTHER PUBLICATIONS

The Search Report for European Application No. 10010607.9-2207 dated Dec. 11, 2012.

* cited by examiner

*Primary Examiner* — Edward Tso
(74) *Attorney, Agent, or Firm* — Bacon & Thomas, PLLC

(57) ABSTRACT

A battery charger for charging a detachably attached battery pack by supplying an electric power from an external power source, the battery charger includes a notification unit for notifying a user of a charging operation by turning on or flickering a light-emitting member. The notification unit notifies the user of a power connection state of the battery charger by turning on or flickering the light-emitting member immediately after the battery charger is electrically connected to the external power source without attaching the battery pack thereto, and the notification unit turns off the light-emitting member after a predetermined period of time lapses and keeps the light-emitting member in an off-state until the battery pack is attached to the battery charger.

15 Claims, 5 Drawing Sheets

BATTERY CHARGER CAPABLE OF NOTIFYING A USER OF A POWER CONNECTION STATE THEREOF

FIELD OF THE INVENTION

The present invention relates to a battery charger and, more particularly, to a notifying operation of a notification unit in a battery charger for charging a battery pack used in an electric power tool.

BACKGROUND OF THE INVENTION

Conventionally, an electric power tool such as an electric screwdriver or an impact wrench utilizes, as its power source, a battery pack detachably attached to a main body. Use of the battery pack makes it possible to eliminate a burden of handling, while at work, an electric cord electrically connected to an external power source, e.g., a commercial power source, and also makes it possible to perform a work at a job site where no external power source exists. If the electric power accumulated in a secondary battery built in the battery pack is reduced, the battery pack is detached from the electric power tool and attached to a battery charger connected to an external power source. The secondary battery is charged to a reusable level by the battery charger.

Figure 6:
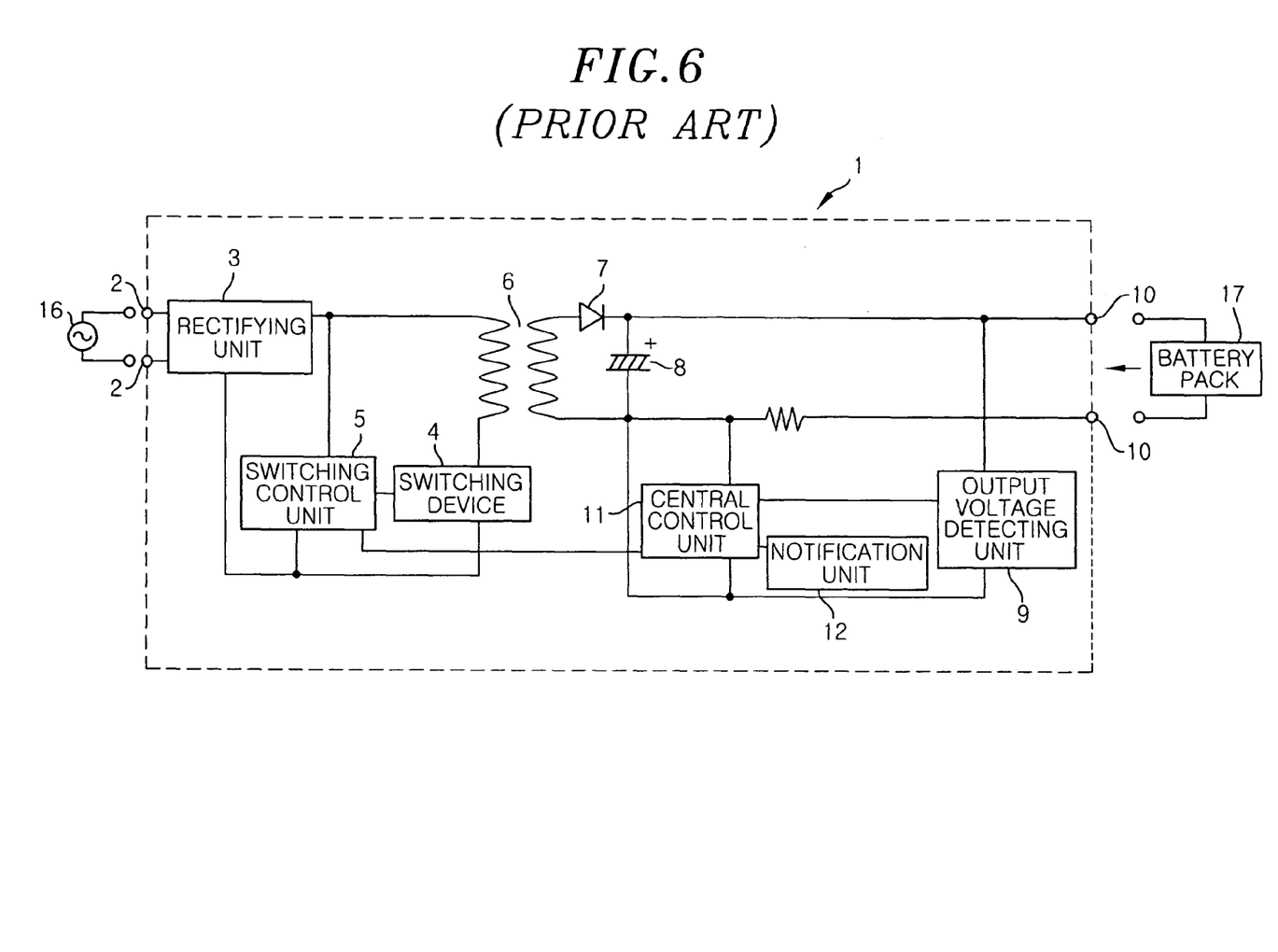
FIG. 6 is a circuit diagram illustrating a conventional battery charger.

As shown in FIG. 6, a conventional battery charger 1 includes, e.g., an external connection unit 2 electrically connected to an external power source 16, a charging circuit for charging a secondary battery (not shown) built in a battery pack 17, a notification unit 12 having a light-emitting member such as a light-emitting diode (LED) or the like, and a central control unit 11, such as a microcomputer or the like, for performing the charging control of the charging circuit and the light-emitting control of the notification unit 12.

The charging circuit includes a transformer 6, a rectifying unit 3 for rectifying the electric current supplied from the external power source 16 through the external connection unit 2 and feeding the rectified current to the transformer 6, a switching device 4 for switching the transformer 6 and a switching control unit 5.

The rectifying unit 3, the switching device 4 and the switching control unit 5 are arranged at a primary side of the transformer 6. The charging circuit further includes a rectifying diode 7, a smoothening capacitor 8, an output voltage detecting unit 9 for detecting the smoothened secondary-side voltage and a charger terminal 10 for electrically interconnecting the internal circuit of the battery pack 17 and the charging circuit, all of which are arranged at a secondary side of the transformer 6. That is, the battery charger 1 performs the charging of the secondary battery by allowing the charging circuit to rectify an electric power supplied from the external power source 16 as an electric power source and boost a voltage and then feeding the rectified electric power to the internal circuit of the battery pack 17. The charging control of the charging circuit is performed by allowing the central control unit 11 to control the switching control unit 5 based on a detection result of the output voltage detecting unit 9 and the kind or charged voltage of the secondary battery outputted from the internal circuit of the battery pack 17.

As disclosed in Japanese Patent Application Publication No. 2003-9410, the charging operations of the charging circuit, such as the charging startup, the charging in progress and the charging completion, and the trouble occurring in the charging process, such as the heat generation in the secondary battery and the like, are differently notified to a user by turning on or flickering a notification unit or changing the color lights thereof, brightness or flickering period of a light-emitting member. Therefore, the user can easily figure out the charging state and trouble in a battery pack by merely seeing the indication on the notification unit. The notification unit is designed to notify respective operations only when the battery pack is attached to the battery charger. In a standby mode in which the battery charger is connected to the external power source but the battery pack is not attached to the battery charger, the notification unit is turned off to thereby reduce consumption of the electric power.

There is also known a battery charger of a type in which, when a battery pack is attached to the battery charger, a central control unit makes charging determination by which to determine whether a battery pack needs to be charged or not. Only the battery pack determined that it is needed to be charged is charged by a charging circuit. The charging determination made by the central control unit is performed based on a detection result of a voltage in the secondary battery built in the battery pack at a time when attaching. In a certain battery charger, charging determination is made depending on the presence or absence of an electric signal indicating that the detected voltage in a secondary battery is equal to or greater than a specified value, which means that the secondary battery is in a fully charged state. In the battery charger of the type that determines the necessity of performing a charging operation through the charging determination, no charging operation is performed with respect to a fully-charged battery pack, thereby preventing the secondary battery from being overcharged.

In case of the power saving type battery charger that turns off the notification unit in the standby mode, however, the user is not aware of trouble such as disconnection or breakage occurring in the battery chargers until the notification unit notifies the user of the occurrence of trouble upon attaching the battery pack or until the notification unit stays inoperable despite the attaching of the battery pack. In particular, even when the occurrence of trouble is notified by the notification unit, the user cannot know whether the trouble has occurred in the battery pack or in the battery charger, thereby making it inconvenient to use the battery charger.

SUMMARY OF THE INVENTION

In view of the above, the present invention provides a battery charger capable of preventing an increase in power consumption while in a standby mode by allowing a notification unit to notify a user of power connection state of the battery charger for a limited time period immediately upon connecting the battery charger to an external power source, and capable of enabling a user to determine occurrence or absence of trouble in the battery charger even when a battery pack is not attached thereto.

In accordance with an embodiment of the present invention, there is provided a battery charger for charging a detachably attached battery pack by supplying an electric power from an external power source, the battery charger including: a notification unit for notifying a user of the charging operation by turning on or flickering a light-emitting member, wherein the notification unit notifies the user of a power connection state of the battery charger by turning on or flickering the light-emitting member immediately after the battery charger is electrically connected to the external power source without attaching the battery pack thereto, and the notification unit turns off the light-emitting member after a predetermined period of time lapses and keeps the light-emitting member in an off-state until the battery pack is attached to the battery charger.

In this configuration, the power connection state of the battery charger connected to the external power source without having the battery pack attached to the battery charger can be notified to the user by turning on or flickering the light-emitting member. Even when the battery pack is not attached to the battery charger, the user can easily determine occurrence or absence of trouble, such as disconnection of the battery charger or failure of the internal circuit, just after the battery charger is connected to the external power source. This assists in enhancing the ease of use of the battery charger and the safety thereof. Since the light-emitting member is kept turned off during the period between the end of the power connection state and the attaching of the battery pack, it is possible to reduce power consumption of the battery charger in a standby mode in which the battery pack is not attached to the battery charger.

Further, a light brightness used in the turning-on or flickering of the light-emitting member performed immediately after the battery charger is electrically connected to the external power source may be darker than a light brightness used in the turning-on or flickering of the light-emitting member performed to notify the user of the charging operation.

In this configuration, the power connection state of the battery charger immediately after the battery charger is connected to the external power source is notified through the light emitting member whose light brightness becomes darker than that used in the notification of the charging operation. This enables the user to distinguish the power connection state from the charging operation, thereby enhancing the ease of use of the battery charger.

The notification unit may include a sound output unit for outputting a sound to the outside, and the sound output unit may notify the user of the power connection state of the battery charger by outputting a sound immediately after the battery charger is electrically connected to the external power source.

With this configuration, provision of the sound output unit ensures that the power connection state of the battery charger connected to the external power source can be notified to the user by both the notification of the light-emitting member and the sound of the sound output unit, which enables the user to easily recognize the power connection state of the battery charger.

If the battery pack is attached to the battery charger in a fully charged state, the notification unit may notify the user of the fully charged state.

In this configuration, if a fully charged battery pack is attached to the battery charger, the light-emitting member notifies the user of the fully charged state of the battery pack. This enables the user to easily recognize that the battery pack attached to the battery charger is a fully charged state.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Hereinafter, embodiments of the present invention will now be described with reference to the accompanying drawings, which form a part hereof.

A battery charger 1 in accordance with a first embodiment of the present invention has a substantially same internal circuit as the circuit illustrated in FIG. 6, but is characterized by a notification operation of a notification unit 12. For that reason, the internal circuit of the battery charger 1 will be described by using the circuit diagram illustrated in FIG. 6, and thus, same reference numerals will be given to same parts, and redundant description thereof will be omitted.

The battery charger 1 of the first embodiment is configured to charge a secondary battery by using an external power source 16, e.g., a commercial power source. The secondary battery is built in a battery pack 17 detachably attached to the battery charger 1. Specifically, the battery charger 1 includes an external connection portion 2 electrically connected to the external power source 16, a charging circuit for charging the battery pack 17 by using the external power source 16 as an electric power source, a notification unit 12 for notifying a user of each individual charging operation in the charging circuit by turning on or flickering a light-emitting member such as a light-emitting diode (LED) or the like, and a central control unit 11 for performing the charging control of the charging circuit and the light-emitting control of the notification unit 12.

Figure 1:
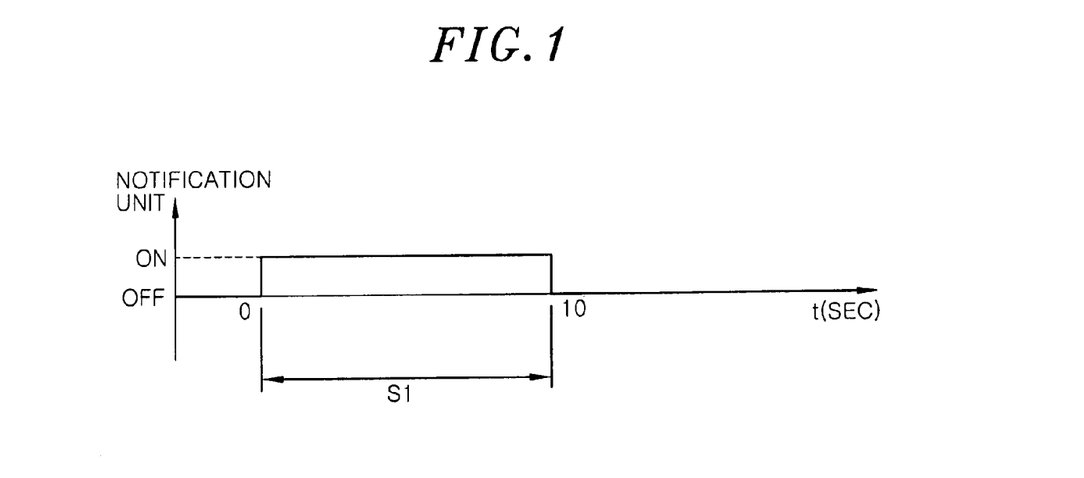
FIG. 1 is a view for explaining a power connection state notifying operation of a notification unit in a battery charger in accordance with a first embodiment of the present invention.

If the external connection unit 2 is connected to the external power source 16 without attaching the battery pack 17 to the battery charger 1, the notification unit 12, e.g., the light-emitting body is turned on as shown in FIG. 1 to notify a power connection state S1 where the battery charger 1 is electrically connected to an external power source 16 while waiting in a standby mode for the battery pack 17 to be attached. The light-emitting member is turned off after a predetermined period of time, about 10 seconds in this example, is elapsed and is kept in an off-state until the operation of the battery charger 1 is changed from a standby state to a charging state by attaching the battery pack 17 thereto, at which time the notification unit 12 notifies the charging operation of the battery charger 1. However, if the battery pack 17 is attached to the battery charger 1 during on-time period (about 10 seconds in this example), that is, while the power connection state S1 is notified, so that the charging operation of the charging circuit is started, the notification unit 12 stops notifying the power connection state S1 and starts notifying individual charging operations, i.e., the charging operations become primarily notified.

In this way, the notification unit 12 is turned on to notify the user of the power connection state of the battery charger 1 immediately after the battery charger 1 is connected to the external power source 16 in a state where the battery pack 17 is not attached to the battery charger 1. This enables the user to determine occurrence or absence of trouble, such as disconnection of the battery charger 1 or a failure of the internal circuit, just after the battery charger 1 is connected to the external power source 16. That is, if the notification unit 12 is turned on, it is indicated that the battery charger 1 is electrically connected to the external power source 16 without having such trouble, and if not, it is indicated that such trouble occurs in the battery charger 1. Therefore, the user can determine occurrence of trouble in the battery charger 1 without having to attach the battery pack 17 to the battery charger 1, thereby enhancing the ease of use of the battery charger 1 and the safety thereof. Further, since the notification unit 12 keeps the light-emitting member turned off until the battery pack 17 is attached to the battery charger 1 during the power connection state S1, it is possible to decrease power consumption of the battery charger 1 in the standby mode in which the battery pack 17 is not attached to the battery charger 1.

In the present embodiment, the on-time period during which the notification unit 12 is turned on to notify the power connection state S1 is not limited to ten seconds but may be as short as five seconds. The on-time period described above is nothing more than an example and can be set arbitrarily. Further, the power connection state S1 of the battery charger 1 can be notified by allowing the notification unit 12 to flicker instead of turn-on.

Further, the user can identify the kind of notification by changing a light brightness of the notification unit 12 in such a manner that the light brightness of the notification unit 12 when notifying the power connection state S1 is different (brighter or darker) from the light brightness of the notification unit 12 when notifying the charging operation in both cases of flicker and turn-on operation.

As an example of the battery charger 1 configured to change the light brightness of the notification unit 12, there is provided a battery charger 1 in accordance with a second embodiment of the present invention, in which the light brightness of the light emitting member is changed by changing the duty ratio of high/low output powers supplied thereto.

Figure 2:
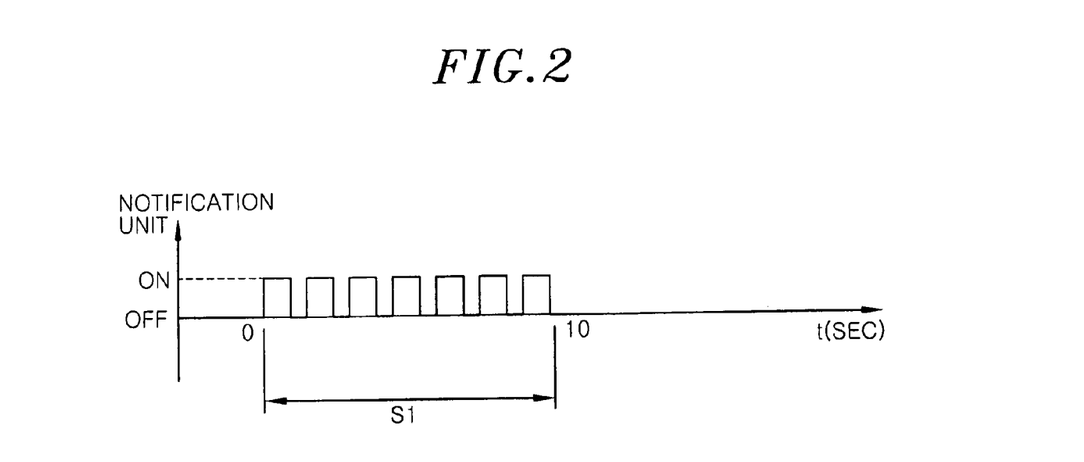
FIG. 2 is a view for explaining a power connection state notifying operation of a notification unit in a battery charger in accordance with a second embodiment of the present invention.

For example, once the power connection state S1 or the charging operation is notified by rapidly flickering the notification unit 12, as shown in FIG. 2, the central control unit 11 controls the duty ratio of high/low output powers (i.e., on-duty ratio) supplied to the light-emitting member during the power connection state S1 to be set smaller than the duty ratio of high/low output powers during the charging operation, eventually reducing the light brightness of the light-emitting member. The light-emitting member of the notification unit 12 rapidly flickers at several hundred Hz, so that the light brightness of the notification unit 12 when notifying the power connection state S1 becomes lower than the light brightness thereof when notifying the charging operation. Therefore, in such a case, the power connection of the battery charger 1 is notified to the user by making the average brightness of flickering light during the power connection state S1 darker than the average brightness of flickering light during the charging operation. The term "rapid flickering" means a state that the user who observes the notification unit 12 cannot recognize the off-time intervals during the flickering operation and would see the notification unit 12 as if it is continuously turned on.

Figure 3:
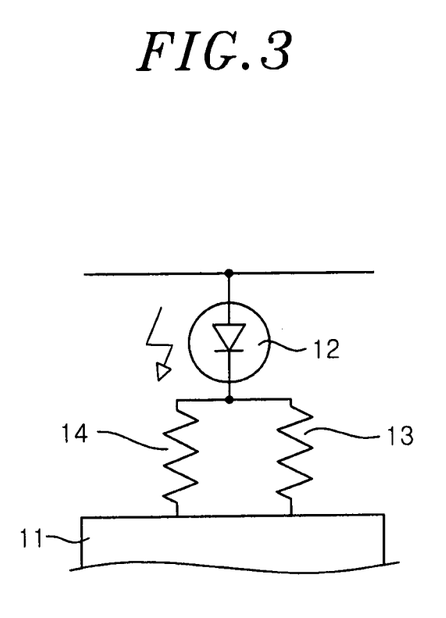
FIG. 3 is a circuit diagram showing a notification unit and its vicinities in a battery charger in accordance with a third embodiment of the present invention.

As another example of the battery charger 1 configured to change the light brightness of the notification unit 12, there is provided a battery charger 1 in accordance with a third embodiment, in which the light brightness of the light-emitting member is changed by changing the electric current supplied to the light-emitting member. For example, once the power connection state S1 or the charging operation is notified by turning on the notification unit 12, as shown in FIG. 3, two voltage-dividing resistors 13 and 14 are arranged between the notification unit 12 and the central control unit 11. The voltage-dividing resistor 14 has a resistance value greater than that of the voltage-dividing resistor 13 and serves as a power connection notifying resistor. In other words, the electric current supplied to the light-emitting member through the voltage-dividing resistor 14 becomes smaller than the electric current supplied through the voltage-dividing resistor 13 serving as a charging operation notifying resistor. Thus, the light brightness of the light-emitting member turned on during the power connection state S1 is set to be lower than the light brightness of the light-emitting member turned on during the charging operation.

In the present embodiment, the power connection state S1 or the charging operation of the battery charger 1 is notified by changing the light brightness of the notification unit 12 while changing the electric current supplied to the light-emitting member. However, it may be applied to a case that the notification unit 12 flickers.

With such configurations, the light brightness when flickering or turning on the notification unit 12 to notify the power connection state S1 is made darker than light brightness when flickering or turning on the notification unit 12 to notify the charging operation. This enables the user to easily identify the notification of the power connection state S1 and the charging operation and to reduce power consumption during the power connection state S1.

Figure 4A:
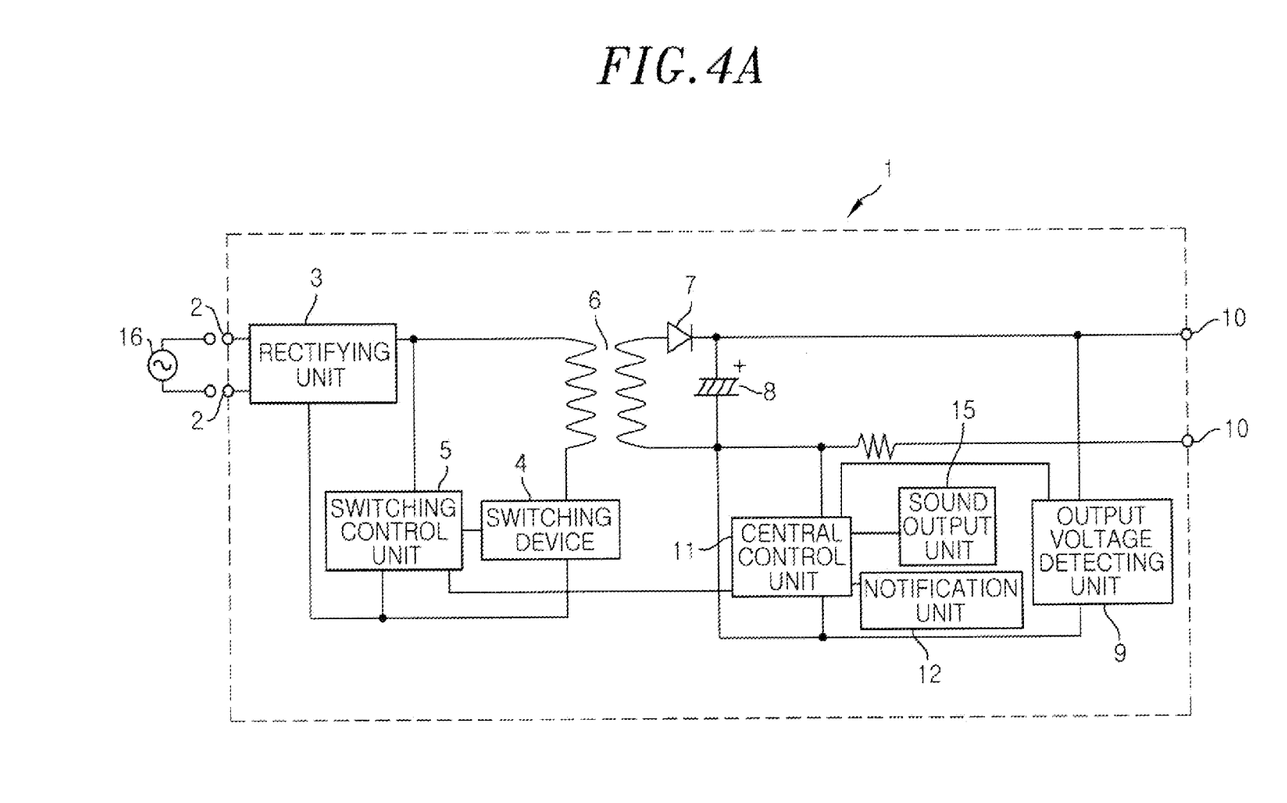
FIG. 4A is a circuit diagram showing a battery charger in accordance with a fourth embodiment of the present invention.
Figure 4B:
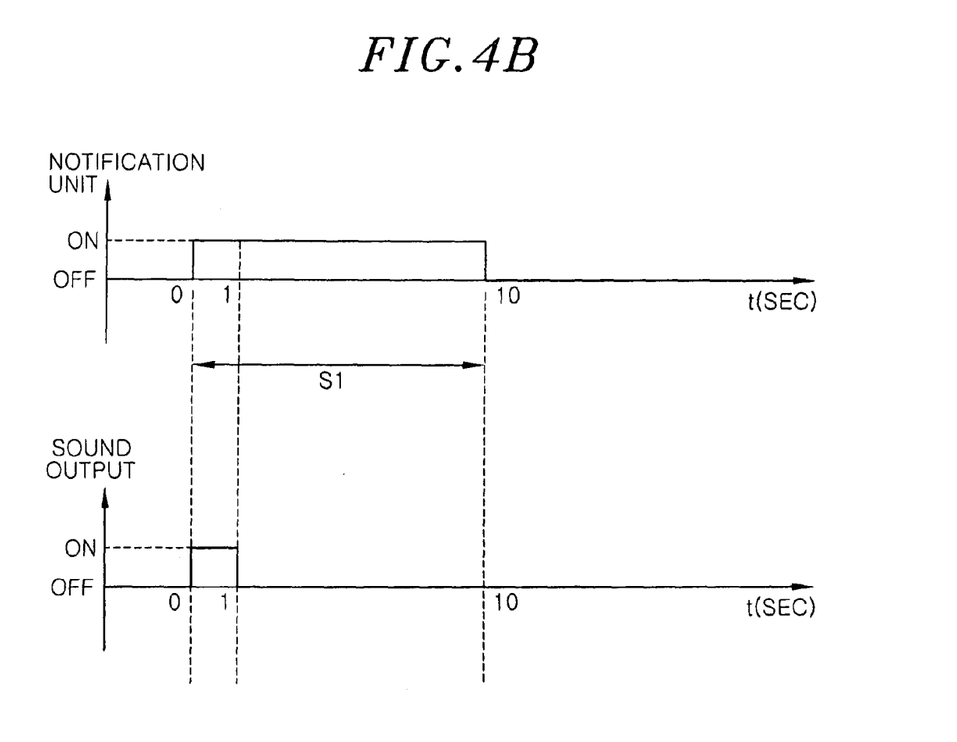
FIG. 4B is a view for explaining a power connection state notifying operation of a notification unit in the battery charger shown in FIG. 4A.

Referring to FIG. 4A, there is shown a battery charger 1 in accordance with a fourth embodiment, which includes a sound output unit 15 such as a buzzer or the like. When the battery charger 1 is electrically connected to the external power source 16, a power connection is notified to the user by the notification unit 12 and the sound output unit 15. More specifically, as shown in FIG. 4B, when the external connection unit 2 is connected to the external power source 16, the notification unit 12 is turned on for about, e.g., ten seconds. Substantially at the same moment of turning on the notification unit 12, the sound output unit 15 generates an electronic sound for about, e.g., one second. Thus, the power connection between the battery charger 1 and the external power source 16 is notified to the user by both of the light of the notification unit 12 and the sound of the sound output unit 15.

Since the notification of the power connection between the battery charger 1 and the external power source 16 is performed by both the light and the sound together as set forth above, the power connection of the battery charger 1 can be visually and acoustically notified to the user, enabling the user to easily recognize the power connection of the battery charger 1. The sound generated from the sound output unit 15 is not limited to the electronic sound but may be a mechanical sound. If not offensive to the ears of the user, the sound generating time period is not limited to one second and may be several seconds. The time period mentioned above is nothing more than an example.

Figure 5:
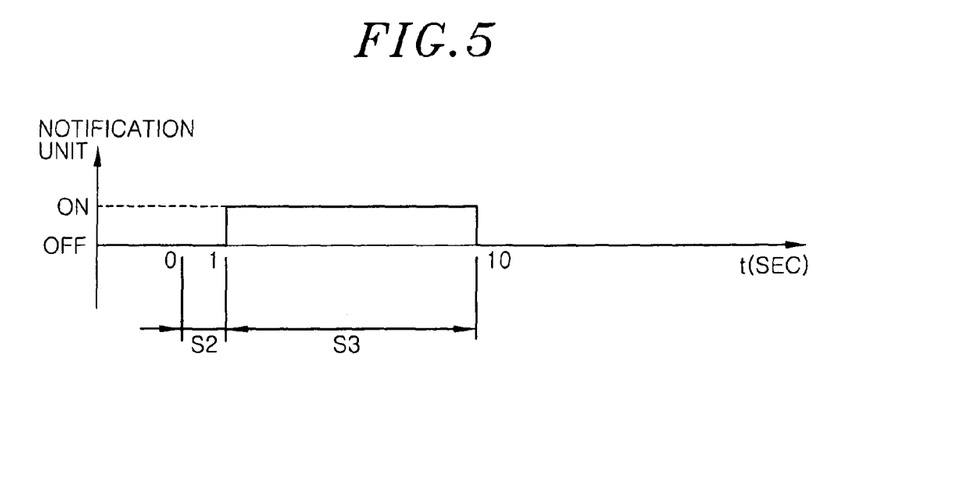
FIG. 5 is a view for explaining a power connection state notifying operation of a notification unit in a battery charger in accordance with a fifth embodiment of the present invention.

Referring to FIG. 5, there is shown a battery charger 1 in accordance with a fifth embodiment. Specifically, when the battery charger 1 having the battery pack 17 attached thereto is connected to the external power source 16, the charging determination S2 is performed immediately after the battery charger 1 is connected to the external power source 16. The notification unit 12 waits for the result of charging determination S2 in an off-state without notifying the power connection state S1, and then, performs the notification of a charging operation or the full charge state S3 based on the result of the charging determination S2.

More specifically, as shown in FIG. 5, when the battery charger 1 having the battery pack 17, e.g., fully charged in the previous charging operation is connected to the external power source 16, the notification unit 12 is kept in the off-state without turning on the light-emitting member for about, e.g., one second required in making the charging determination S2 since the charging determination S2 is performed immediately after the battery charger 1 having the battery pack 17 attached thereto is connected to the external source 16. Accordingly, the notification unit 12 turns on the light-emitting member to notify the fully charged state of the battery pack 17 after one second and turns off the light-emitting member after about, e.g., ten seconds (i.e., on-time period is about nine seconds). The light-emitting member is kept in the off-state until the battery pack 17 is replaced with another one. This makes it possible to notify the user of the fully charged state of the battery pack 17 immediately after the battery charger 1 is connected to the external power source 16. Further, it is possible to reduce power consumption even when the battery pack 17 waits for another one to be replaced in the fully charged state.

The fully charged state may be visually and acoustically notified to the user by allowing the notification unit 12 to notify the full charge state S3 and by allowing the sound output unit 15 to generate a sound. The on-time period of the full charge state S3 may be longer than nine seconds and the full charged state S3 may be notified by allowing the light-emitting member to flicker. The on-time period of the full charge state S3 noted above is nothing more than an example.

While the invention has been shown and described with respect to the embodiments, it will be understood by those skilled in the art that various changes and modification may be made without departing from the scope of the invention as defined in the following claims.

What is claimed is:

1. A battery charger for charging a detachably attached battery pack by supplying an electric power from an external power source, the battery charger comprising:
a notification unit for notifying a user of a charging operation by turning on or flickering a light-emitting member,
wherein the notification unit is configured to notify the user of a power connection state of the battery charger by turning on or flickering the light-emitting member immediately after the battery charger is electrically connected to the external power source without attaching the battery pack thereto, and the notification unit turns off the light-emitting member after a predetermined period of time lapses and keeps the light-emitting member in an off-state until the battery pack is attached to the battery charger.

2. The battery charger of claim 1, wherein a light brightness used in the turning-on or flickering of the light-emitting member performed immediately after the battery charger is electrically connected to the external power source is darker than a light brightness used in the turning-on or flickering of the light-emitting member performed to notify the user of the charging operation.

3. A battery charger for charging a detachably attached battery pack by supplying an electric power from an external power source, the battery charger comprising:
a notification unit for notifying a user of a charging operation by turning on or flickering a light-emitting member,
wherein the notification unit is configured to notify the user of a power connection state of the battery charger by turning on or flickering the light-emitting member immediately after the battery charger is electrically connected to the external power source without attaching the battery pack thereto, and the notification unit turns off the light-emitting member after a predetermined period of time lapses and keeps the light-emitting member in an off-state until the battery pack is attached to the battery charger,
wherein the notification unit includes a sound output unit outputting a sound to the outside, and
wherein the sound output unit notifies the user of the power connection state of the battery charger by outputting a sound immediately after the battery charger is electrically connected to the external power source.

4. A battery charger for charging a detachably attached battery pack by supplying an electric power from an external power source, the battery charger comprising:
a notification unit for notifying a user of a charging operation by turning on or flickering a light-emitting member,
wherein the notification unit is configured to notify the user of a power connection state of the battery charger by turning on or flickering the light-emitting member immediately after the battery charger is electrically connected to the external power source without attaching the battery pack thereto, and the notification unit turns off the light-emitting member after a predetermined period of time lapses and keeps the light-emitting member in an off-state until the battery pack is attached to the battery charger, and
wherein a light brightness used in the turning-on or flickering of the light-emitting member performed immediately after the battery charger is electrically connected to the external power source is darker than a light brightness used in the turning-on or flickering of the light-emitting member performed to notify the user of the charging operation,
wherein the notification unit includes a sound output unit for outputting a sound to the outside, and
wherein the sound output unit notifies the user of the power connection state of the battery charger by outputting a sound immediately after the battery charger is electrically connected to the external power source.

5. The battery charger of claim 1, wherein if the battery pack is attached to the battery charger in a fully charged state, the notification unit notifies the user of the fully charged state.

6. The battery charger of claim 2, wherein if the battery pack is attached to the battery charger in a fully charged state, the notification unit notifies the user of the fully charged state.

7. The battery charger of claim 3, wherein if the battery pack is attached to the battery charger in a fully charged state, the notification unit notifies the user of the fully charged state.

8. The battery charger of claim 1, wherein the notification unit notifies the user of the power connection state if it is determined that the battery charger is ready to perform the charging operation once the battery pack is attached thereto.

9. The battery charger of claim 1, wherein the notification unit notifies the user of the power connection state if it is determined that the battery charger is electrically connected to the external power source and there is no failure in the battery charger.

10. The battery charger of claim 1, wherein the notification units notifies the user of the power connection state without user's manipulation.

11. The battery charger of claim 1, wherein if the external power source is electrically connected to the battery charger while the battery pack is attached to the battery charger in a fully charged state, the notification unit notifies the user of the fully charged state without notifying the power connection state.

12. The battery charger of claim 3, wherein the notification unit notifies the user of the power connection state if it is determined that the battery charger is ready to perform the charging operation once the battery pack is attached thereto.

13. The battery charger of claim 3, wherein the notification unit notifies the user of the power connection state if it is determined that the battery charger is electrically connected to the external power source and there is no failure in the battery charger.

14. The battery charger of claim 3, wherein the notification units notifies the user of the power connection state without user's manipulation.

15. The battery charger of claim 3, wherein if the external power source is electrically connected to the battery charger while the battery pack is attached to the battery charger in a fully charged state, the notification unit notifies the user of the fully charged state without notifying the power connection state.

* * * * *